(12) United States Patent
Nomura et al.

(10) Patent No.: US 9,391,327 B2
(45) Date of Patent: Jul. 12, 2016

(54) POSITIVE ELECTRODE FOR RECHARGEABLE LITHIUM BATTERY, PREPARING SAME, AND RECHARGEABLE LITHIUM BATTERY

(71) Applicant: SAMSUNG SDI CO., LTD., Yongin-si, Gyeonggi-do (KR)

(72) Inventors: Keisuke Nomura, Yokohama (JP); Yuki Takei, Yokohama (JP); Masatsugu Nakano, Yokohama (JP)

(73) Assignee: Samsung SDI Co, Ltd., Gyeonggi-do (KR)

( * ) Notice: Subject to any disclaimer, the term of this patent is extended or adjusted under 35 U.S.C. 154(b) by 0 days.

(21) Appl. No.: 14/540,857

(22) Filed: Nov. 13, 2014

(65) Prior Publication Data

US 2015/0147653 A1  May 28, 2015

(30) Foreign Application Priority Data

Nov. 22, 2013 (JP) ................................ 2013-241551
Oct. 24, 2014 (KR) ........................ 10-2014-0145205

(51) Int. Cl.
*H01M 4/00* (2006.01)
*H01M 4/13* (2010.01)
*H01M 4/525* (2010.01)
*C01G 53/00* (2006.01)
*H01M 10/052* (2010.01)
*H01M 4/02* (2006.01)

(52) U.S. Cl.
CPC .............. *H01M 4/525* (2013.01); *C01G 53/42* (2013.01); *C01G 53/50* (2013.01); *C01P 2002/74* (2013.01); *C01P 2004/61* (2013.01); *C01P 2006/12* (2013.01); *H01M 10/052* (2013.01); *H01M 2004/021* (2013.01); *Y02E 60/122* (2013.01)

(58) Field of Classification Search
None
See application file for complete search history.

(56) References Cited

U.S. PATENT DOCUMENTS

| 2003/0170540 | A1* | 9/2003 | Ohzuku | H01M 4/13 |
| | | | | 429/231.1 |
| 2006/0188780 | A1* | 8/2006 | Fujii | C01G 45/1228 |
| | | | | 429/223 |
| 2011/0020704 | A1* | 1/2011 | Fukuchi | H01M 4/362 |
| | | | | 429/223 |
| 2012/0104311 | A1* | 5/2012 | Levasseur | C01G 51/42 |
| | | | | 252/182.1 |
| 2013/0236780 | A1 | 9/2013 | Yokote et al. | |
| 2013/0313471 | A1* | 11/2013 | Endo | C01G 53/50 |
| | | | | 252/182.1 |
| 2014/0087262 | A1 | 3/2014 | Imahashi et al. | |

FOREIGN PATENT DOCUMENTS

| JP | 2001-167761 A | 6/2001 |
| JP | 2012-230898 A | 11/2012 |
| JP | 5282170 B2 | 5/2013 |
| JP | 2013-120676 A | 6/2013 |
| WO | WO 2012/039413 A1 | 3/2012 |

* cited by examiner

*Primary Examiner* — Patrick Ryan
*Assistant Examiner* — Jose Colucci Rios
(74) *Attorney, Agent, or Firm* — Knobbe Martens Olson & Bear LLP

(57) ABSTRACT

A positive active material is disclosed that includes a lithium nickel composite oxide represented by the following Chemical Formula 1, wherein a full width at half maximum (FWHM$_{003}$) at a (003) plane in X-ray diffraction ranges from about 0.12 to about 0.155, and a rechargeable lithium ion battery including the same.

$Li_aNi_xCo_yM_zO_2$ [Chemical Formula 1]

8 Claims, 1 Drawing Sheet

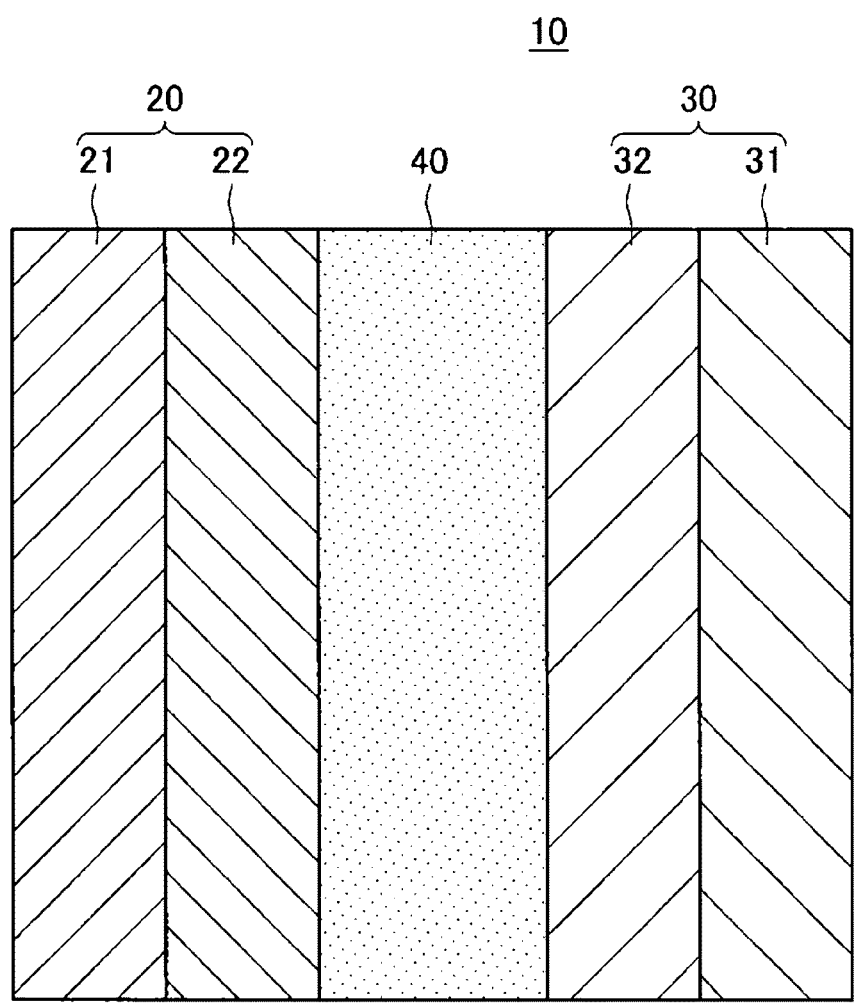

POSITIVE ELECTRODE FOR RECHARGEABLE LITHIUM BATTERY, PREPARING SAME, AND RECHARGEABLE LITHIUM BATTERY

RELATED APPLICATIONS

Any and all priority claims identified in the Application Data Sheet, or any correction thereto, are hereby incorporated by reference under 37 CFR 1.57. For example, this application claims priority to and the benefit of Japanese Patent Application No. 2013-241551 filed in the Japanese Patent Office on Nov. 22, 2013, and Korean Patent Application No. 10-2014-0145205 filed in the Korean Intellectual Property Office on Oct. 24, 2014, the disclosures of which are incorporated herein in their entirety.

BACKGROUND

1. Field

This disclosure relates to a positive electrode for a rechargeable lithium battery, a method of preparing the same, and a rechargeable lithium battery.

2. Description of the Related Technology

Recently, a lithium nickel composite oxide including nickel has been suggested as a positive active material capable of achieving a high potential and high capacity in a rechargeable lithium ion battery.

For example, JP 2001-167761 discloses a technology of improving cycle characteristics by using $LiMeO_2$ having a (I003)/(I104) ratio of a diffraction peak intensity (I003) at a (003) plane and a diffraction peak intensity (I104) at a (104) plane in the X-ray diffraction in a range of greater than or equal to about 1.5 to less than or equal to about 4 (herein, Me is at least one selected from Ni and Co) as a positive active material.

In addition, JP 2013-120676 discloses a technology of improving battery characteristics by using $Li_xNi_{1-y}M_yO_{2+a}$ having less than or equal to about 0.80 of a diffraction peak intensity ratio (104/003) of (104) and (003) planes in the X-ray diffraction as a positive active material.

Patent Laid-open: JP 2001-167761
Patent Laid-open: JP 2013-120676

JP 2001-167761 and JP 2013-120676 describe suppression of Ni ions from being mixed into Li sites in a crystal (so-called, a cation mixing phenomenon) and stabilize the crystalline structure by increasing a ratio of diffraction peak intensity at the (003) plane relative to diffraction peak intensity at the (104) plane in the X-ray diffraction. However, when a lithium nickel composite oxide having a high Ni ratio is used as the positive active material to manufacture a rechargeable lithium ion battery having a high potential and simultaneously, high-capacity, structural stability of the positive active material is deteriorated as the Ni ratio increases.

Accordingly, disclosures of JP 2001-167761 and JP 2013-120676 have a problem of destabilizing the structure of the positive active material, deteriorating cycle characteristics, and initial charge and discharge efficiency of the rechargeable lithium ion battery.

SUMMARY

Some embodiments provide a positive active material having high discharge capacity and simultaneously, improved cycle characteristics and initial charge and discharge efficiency despite a high Ni ratio, a rechargeable lithium ion battery using the positive active material, and a method of preparing the rechargeable lithium ion battery.

Some embodiments provide a positive active material that includes a lithium nickel composite oxide represented by the following Chemical Formula 1, wherein a full width at half maximum ($FWHM_{003}$) at a (003) plane in X-ray diffraction ranges from about 0.12 to about 0.155.

$$Li_aNi_xCo_yM_zO_2 \quad \text{[CHEMICAL FORMULA 1]}$$

In the Chemical Formula 1, M is one or more kinds of metal element selected from Al, Mn, Cr, Fe, V, Mg, Ti, Zr, Nb, Mo, W, Cu, Zn, Ga, In, Sn, La, and Ce,
0.20≤a≤1.20,
0.80≤x≤1.00,
0<y≤0.20,
0≤z≤0.10, and
x+y+z=1.

The positive active material may have a $(I_{003})/(I_{104})$ ratio of a diffraction peak intensity $(I_{003})$ at a (003) plane and a diffraction peak intensity $(I_{104})$ at a (104) plane in X-ray diffraction ranges from about 1.05 to about 1.25.

The lithium nickel composite oxide particle may have an average secondary particle diameter of about 3 μm to about 9 μm.

The lithium nickel composite oxide particle may have a specific surface area of about 0.38 m²/g to about 1.05 m²/g.

In the embodiment, M is Al or Mn, 0.80≤x<1.00, 0<y≤0.15, 0<z≤5 0.05, and x+y+z=1.

Another embodiment provides a method of preparing a positive active material that includes adding a saturated NaOH aqueous solution to a mixed aqueous solution including a hydrate of Co and Ni and a M-containing compound in a dropwise fashion so as to maintaining pH to be 8 to 12, and agitating the resulting mixture to prepare a hydroxide salt precursor of a transition metal; and mixing the hydroxide salt precursor of the transition metal with a Li compound, and firing the resultant mixture under an oxygen atmosphere at about 700° C. to about 800° C. for about 1 hour to about 10 hours to prepare a lithium nickel composite oxide.

The M-containing compound is a sulfate, a nitrate, an oxide, or a hydroxide of the metal element M, and the M is one or more kinds of metal element selected from Al, Mn, Cr, Fe, V, Mg, Ti, Zr, Nb, Mo, W, Cu, Zn, Ga, In, Sn, La, and Ce.

The mixing mole ratio of the hydrate of Co and Ni and the M-containing compound may be Ni:Co:Al=(80 to 84):15:(1 to 5).

Yet another embodiment provides a rechargeable lithium ion battery including the positive electrode, including a positive active material, a negative electrode, and an electrolyte.

According to one embodiment, a positive active material having a high Ni ratio may improve discharge capacity and simultaneously, cycle characteristics and initial charge and discharge efficiency.

BRIEF DESCRIPTION OF THE DRAWINGS

FIG. 1 is a schematic view showing a structure of a rechargeable lithium ion battery according to one embodiment.

DETAILED DESCRIPTION OF CERTAIN INVENTIVE EMBODIMENTS

Exemplary embodiments will hereinafter be described in detail. However, these embodiments are only exemplary, and the present disclosure is not limited thereto.

First, a rechargeable lithium ion battery according to one embodiment is described.

A rechargeable lithium ion battery according to one embodiment includes a lithium nickel composite oxide having a high Ni ratio.

The rechargeable lithium ion battery using the lithium nickel composite oxide having a high Ni ratio as a positive active material may realize a high potential and high discharge capacity.

However, since structural stability of the lithium nickel composite oxide is deteriorated as a Ni ratio becomes higher, cation mixing (divalent ions of Ni occupy. Li sites in a crystal) may easily occur.

Herein, when the structural stability of the lithium nickel composite oxide is deteriorated, and the cation mixing largely occurs, cycle characteristics and initial charge and discharge efficiency (i.e., usable capacity in a rechargeable lithium ion battery) are deteriorated.

Accordingly, a rechargeable lithium ion battery using the lithium nickel composite oxide having a high Ni ratio as a positive active material has a drawback of not increasing initial charge and discharge efficiency and cycle characteristics.

On the other hand, when the lithium nickel composite oxide has a high $(I_{003})/(I_{104})$ ratio of a diffraction peak intensity $(I_{003})$ at a (003) plane and a diffraction peak intensity $(I_{104})$ at a (104) plane in the X-ray diffraction, crystallinity may be increased, and cation mixing may hardly occur.

Accordingly, the lithium nickel composite oxide having a high diffraction peak intensity ratio $(I_{003}/I_{104})$ may be used as a positive active material to suppress the cation mixing and to improve initial charge and discharge efficiency and cycle characteristics.

However, the lithium nickel composite oxide having a high diffraction peak intensity ratio $(I_{003}/I_{104})$ as a positive active material may improve initial charge and discharge efficiency and cycle characteristics but deteriorate discharge capacity.

Therefore, a lithium nickel composite oxide having a high Ni ratio may not have improved discharge capacity, initial charge and discharge efficiency, and cycle characteristics.

One embodiment provides a positive active material of a nickel composite oxide having a Ni ratio of greater than or equal to about 80% but a full width at half maximum $(FWHM_{003})$ of diffraction peak at the (003) plane in a range of about 0.12 to about 0.155 in the X-ray diffraction. Furthermore, the positive active material may have a ratio $(I_{003}/I_{104})$ between diffraction peak intensity $I_{003}$ of (003) plane and diffraction peak intensity $I_{104}$ of (104) plane in a range of about 1.05 to about 1.25. The diffraction peak intensity may be obtained by using a CuKα ray.

When the ratio $(I_{003}/I_{104})$ of diffraction peak intensity $I_{003}$ of (003) plane and diffraction peak intensity $I_{104}$ and the full width at half maximum $(FWHM_{003})$ of diffraction peak of the (003) plane in the X-ray diffraction are within the ranges, discharge capacity, initial charge and discharge efficiency and cycle characteristics of a rechargeable lithium battery may be all improved.

The lithium nickel composite oxide particle may have an average secondary particle diameter (D50) of about 3 μm to about 9 μm.

The lithium nickel composite oxide particle may have a specific surface area of about 0.38 m²/g to about 1.05 m²/g.

When the lithium nickel composite oxide particle has the aforementioned average secondary particle diameter and specific surface area, discharge capacity, initial charge and discharge efficiency, and cycle characteristics may be all improved.

In other words, even though a lithium nickel composite oxide having a Ni ratio of greater than or equal to about 80% has a relatively small ratio $(I_{003}/I_{104})$ of diffraction peak intensity but an average secondary particle diameter (D50) and a specific surface area within the aforementioned ranges, discharge capacity, initial charge and discharge efficiency and cycle characteristics may be all improved.

Hereinafter, referring to FIG. 1, a specific structure of the rechargeable lithium ion battery 10 according to one embodiment is described.

FIG. 1 is a schematic view showing a structure of a rechargeable lithium ion battery according to an embodiment.

As shown in FIG. 1, a rechargeable lithium ion battery 10 is a rechargeable lithium ion battery including a lithium nickel composite oxide having a high Ni ratio as a positive active material, a positive electrode 20, a negative electrode 30, and a separator layer 40.

The rechargeable lithium ion battery 10 is not particularly limited in a shape.

For example, the rechargeable lithium ion battery 10 may have any shape such as a cylinder, a prism, a laminate type, a button type, and the like.

The positive electrode 20 includes a current collector 21 and a positive active material layer 22.

The current collector 21 may consist of, for example aluminum (Al).

The positive active material layer 22 includes at least positive active material and a conductive material, and further includes a binder.

The positive active material may include a lithium nickel composite oxide having a high Ni ratio.

The lithium nickel composite oxide having a high Ni ratio according to an exemplary embodiment may have a composition, for example, represented by the following Chemical Formula 1.

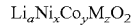

CHEMICAL FORMULA 1

In the Chemical Formula 1, M is one or more kinds of metal element selected from Al, Mn, Cr, Fe, V, Mg, Ti, Zr, Nb, Mo, W, Cu, Zn, Ga, In, Sn, La, and Ce, 0.20≤a≤1.20,
0.80≤x<1.00,
0<y≤0.20,
0≤z≤0.10, and
x+y+z=1.

In the lithium nickel composite oxide having a high Ni ratio according to one embodiment of the present invention, specifically M is Al or Mn,
0.80≤x<1.00,
0<y≤0.15,
0<z≤0.05, and x+y+z=1.

According to one embodiment, a rechargeable lithium ion battery includes a lithium nickel composite oxide having a high Ni ratio and the composition as a positive active material and simultaneously, having a $(I_{003})/(I_{104})$ ratio of a diffraction peak intensity $(I_{003})$ at a (003) plane and a diffraction peak intensity $(I_{104})$ at a (104) plane in the X-ray diffraction and a full width at half maximum $(FWHM_{003})$ of the diffraction peak of the (003) plane within the aforementioned ranges and may improve initial charge and discharge efficiency, discharge capacity, and cycle characteristics as evidenced in the post-described Examples.

On the other hand, the rechargeable lithium ion battery according to an exemplary embodiment may include other materials than the lithium nickel composite oxide having a high Ni ratio as a positive active material.

In addition, the lithium nickel composite oxide having a high Ni ratio according to one embodiment may have a ($I_{003}$)/($I_{104}$) ratio of a diffraction peak intensity ($I_{003}$) at a (003) plane and a diffraction peak intensity ($I_{104}$) at a (104) plane in X-ray diffraction in a range of greater than or equal to about 1.05 and less than or equal to about 1.25.

As evidenced in the post-described Examples, when the diffraction peak intensity ratio ($I_{003}/I_{104}$) is within the range, discharge capacity, initial charge and discharge efficiency, and cycle characteristics may be improved.

The diffraction peak intensity ratio ($I_{003}/I_{104}$) of the (003) and (104) planes is a parameter showing crystallinity of the lithium nickel composite oxide, and thus, as the diffraction peak intensity ratio ($I_{003}/I_{104}$) becomes higher, crystallinity becomes higher while cation mixing becomes more difficult.

In other words, when the diffraction peak intensity ratio ($I_{003}/I_{104}$) of the (003) and (104) planes is less than about 1.05, the cation mixing may largely occur in the lithium nickel composite oxide, and thus, cycle characteristics and initial charge and discharge efficiency may be deteriorated.

On the other hand, when the diffraction peak intensity ratio ($I_{003}/I_{104}$) of the (003) and (104) planes is greater than about 1.25, the lithium nickel composite oxide has extremely high crystallinity, and discharge capacity is deteriorated.

In addition, the lithium nickel composite oxide having a high Ni ratio according to one embodiment may have a full width at half maximum ($FWHM_{003}$) of the (003) plane in a range of greater than or equal to about 0.12 to less than or equal to about 0.155 in the X-ray diffraction.

As evidenced in the post-described Examples, when the full width at half maximum ($FWHM_{003}$) of the (003) plane is within the range, discharge capacity, initial charge and discharge efficiency and cycle characteristics may be improved.

Specifically, when the full width at half maximum ($FWHM_{003}$) of the (003) plane is less than about 0.12, discharge capacity, initial charge and discharge efficiency and cycle characteristics may be deteriorated.

In addition, when the full width at half maximum ($FWHM_{003}$) of the (003) plane is greater than about 0.155, cycle characteristics and initial charge and discharge efficiency may be deteriorated.

On the other hand, the aforementioned diffraction peak intensity ratio ($I_{003}/I_{104}$) and the full width at half maximum ($FWHM_{003}$) of (003) plane may be obtained from the X-ray diffraction pattern of the lithium nickel composite oxide having a high Ni ratio according to one embodiment.

The X-ray diffraction pattern of the lithium nickel composite oxide having a high Ni ratio according to one embodiment may be, for example, measured by a well-known X-ray diffraction method.

In addition, the lithium nickel composite oxide having a high Ni ratio according to one embodiment may be a secondary particle formed by agglomerating fine primary particles, and this secondary particle may have an average particle diameter (D50) ranging from greater than or equal to about 3 µm and less than or equal to about 9 µm.

As evidenced in the post-described Examples, when the average secondary particle diameter (D50) is within the range, initial charge and discharge efficiency, discharge capacity and cycle characteristics are improved.

Specifically, when the lithium nickel composite oxide having a high Ni ratio has an average secondary particle diameter (D50) of less than about 3 µm, discharge capacity, initial charge and discharge efficiency and cycle characteristics may be deteriorated.

On the other hand, when the lithium nickel composite oxide having a high Ni ratio has an average secondary particle diameter (D50) of greater than about 9 µm, cycle characteristics are remarkably deteriorated.

Herein, the D50 indicates a cumulative particle diameter of about 50% in a particle diameter distribution and is also called a median diameter.

On the other hand, the particle diameter distribution for obtaining D50 of the secondary particle may be measured by a well-known measurement method, for example, a laser diffraction•scattering method.

Furthermore, the particle diameter of a secondary particle according to an exemplary embodiment indicates a diameter when the secondary particle is regarded as a sphere.

In addition, the lithium nickel composite oxide having a high Ni ratio according to one embodiment may have a specific surface area ranging from greater than or equal to about 0.38 m²/g to less than or equal to about 1.05 m²/g.

As evidenced in the post-described Examples, when the specific surface area is within the range (a measurement value±10% in Examples), initial charge and discharge efficiency, discharge capacity, and cycle characteristics are improved.

Specifically, when the lithium nickel composite oxide having a high Ni ratio has a specific surface area of less than about 0.38 m²/g, discharge capacity, initial charge and discharge efficiency and cycle characteristics are deteriorated.

On the other hand, when the lithium nickel composite oxide having a high Ni ratio has a specific surface area of greater than about 1.05 m²/g, cycle characteristics are remarkably deteriorated.

Herein, the specific surface area may be measured by, a well-known method, for example, a nitrogen adsorption method.

On the other hand, the content of the lithium nickel composite oxide having a high Ni ratio is not particularly limited, and may be any content that may be applicable to a positive active material layer of a conventional rechargeable lithium ion battery.

The conductive agent may be, for example carbon black such as ketjen black, acetylene black, and the like, natural graphite, artificial graphite, and the like.

However, the conductive agent may be any one in order to improve conductivity of a positive electrode without limitation.

The content of the conductive material is not particularly limited, and may be any content that may be applicable in a positive active material layer of a rechargeable lithium ion battery.

The binder may be, for example polyvinylidene fluoride, an ethylene-propylene-diene terpolymer, a styrene-butadiene rubber, an acrylonitrile-butadiene rubber, fluororubber, polyvinyl acetate, polymethyl methacrylate, polyethylene, nitrocellulose, and the like.

But the binder may not be particularly limited if it binds the positive active material and the conductive material on the current collector 21.

The content of the binder is not particularly limited, and may be any content that may be applicable in a positive active material layer of a rechargeable lithium ion battery.

The positive active material layer 22 is formed by dispersing a positive active material, a conductive agent and a binder into an appropriate organic solvent (for example, N-methyl-2-pyrrolidone) to prepare slurry, coating the slurry on a current collector 21, and then, drying and compressing it.

The negative electrode 30 includes a current collector 31 and a negative active material layer 32.

The current collector 31 may include, for example, copper (Cu), nickel (Ni), and the like.

Herein, the negative active material layer 32 may be any negative active material layer of a rechargeable lithium ion battery.

For example, the negative active material layer 32 includes a negative active material and may further include a binder.

The negative active material may be, for example, a graphite active material (artificial graphite, natural graphite, a mixture of artificial graphite and natural graphite, natural graphite coated with artificial graphite, and the like), a mixture of a particulate of silicon (Si) or tin (Sn) or oxides thereof and a graphite active material, a silicon or tin particulate, an alloy including silicon or tin as a basic material, and titanium-based oxide compound such as $Li_4Ti_5O_{12}$ and the like.

The silicon oxide may be represented by $SiO_x$ ($0 \le x \le 2$).

The negative active material may be, for example lithium metal and the like besides the above materials.

The binder may be the same as the binder of the positive active material layer 22.

A weight ratio of the negative active material and the binder is not particularly limited, and may be any one that may be adopted in a conventional rechargeable lithium ion battery.

The separator layer 40 includes a separator 41 and an electrolyte solution 43.

The separator is not particularly limited, and may be any separator usable in a rechargeable lithium ion battery.

The separator may be preferable a porous film or a nonwoven fabric having excellent high rate discharge performance that may be used singularly or with other materials.

The separator may be coated with an inorganic material such as $Al_2O_3$, $SiO_2$ and the like.

The materials constituting the separator may be, for example, a polyolefin-based resin such as polyethylene, polypropylene, and the like, a polyester-based resin such as polyethylene terephthalate, polybutylene terephthalate, and the like, a polyvinylidene difluoride, vinylidene fluoride-hexafluoro propylene copolymer, a vinylidene fluoride-perfluoro vinylether copolymer, a vinylidene fluoride-tetrafluoroethylene copolymer, a vinylidene fluoride-trifluoro ethylene copolymer, a vinylidene fluoride-fluoro ethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, and the like.

The porosity of the separator not particularly limited, and may be any porosity of a separator in a conventional rechargeable lithium ion battery.

The electrolyte solution may be any non-aqueous electrolyte that may be applicable in a conventional rechargeable lithium battery without limitation.

Herein, the electrolyte solution has a composition including an electrolytic salt in a non-aqueous solvent.

The non-aqueous solvent may be, for example, cyclic carbonate esters such as propylene carbonate, ethylene carbonate, butylene carbonate, chloroethylene carbonate, vinylene carbonate, and the like; cyclic esters such as γ-butyrolactone, γ-valero lactone and the like; linear carbonates such as dimethyl carbonate, diethylcarbonate, ethylmethyl carbonate, and the like; linear esters such as methyl formate, methyl acetate, methyl butyrate, and the like; ethers such as tetrahydrofuran or a derivative thereof; ethers such as 1,3-dioxane, 1,4-dioxane, 1,2-dimethoxy ethane, 1,4-dibutoxyethane, methyl diglyme and the like; nitriles such as acetonitrile, benzonitrile, and the like; dioxolane or a derivative thereof; ethylene sulfide, sulfolane, sultone or a derivative thereof which may be used singularly or as a mixture of two or more, without limitation.

The electrolytic salt may be, for example, an inorganic ion salt including lithium (Li), sodium (Na) or potassium (K) such as $LiClO_4$, $LiBF_4$, $LiAsF_6$, $LiPF_6$, $LiSCN$, $LiBr$, $LiI$, $Li_2SO_4$, $Li_2B_{10}Cl_{10}$, $NaClO_4$, $NaI$, $NaSCN$, $NaBr$, $KClO_4$, $KSCN$ and the like, an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearyl sulfate, lithium octyl sulfate, lithium dodecylbenzene sulphonate, and the like.

The ionic compounds may be used singularly or in a mixture of two or more.

The concentration of the electrolytic salt may be the same as that of a non-aqueous electrolyte used in a conventional rechargeable lithium battery, and is not particularly limited.

In the present disclosure, an electrolyte solution including an appropriate lithium compound (electrolytic salt) at a concentration of about 0.5 mol/L to about 2.0 mol/L may be used.

A method of preparing the lithium nickel composite oxide having a high Ni ratio is illustrated according to another embodiment.

The method of preparing the lithium nickel composite oxide according to one exemplary embodiment has no particular limit but may include, for example, a co-precipitation method.

Hereinafter, the co-precipitation method of preparing the lithium nickel composite oxide is illustrated as one example.

First of all, nickel sulfate hexahydrate ($NiSO_4.6H_2O$), cobalt sulfate pentahydrate ($CoSO_4.5H_2O$) and a metal element M-containing compound are dissolved in ion exchange water, preparing a mixed aqueous solution.

Herein, the total weight of the nickel sulfate hexahydrate, the cobalt sulfate pentahydrate, and the metal element M-containing compound may be, for example, about 20 wt % based on the total weight of the mixed aqueous solution.

The nickel sulfate hexahydrate, the cobalt sulfate pentahydrate, and the metal element M-containing compound may be mixed to have a desired ratio among Ni, Co and M.

Herein, the mole ratio of each element may be determined depending on the composition of a prepared lithium nickel composite oxide.

For example, $LiNi_{0.8}Co_{0.15}Al_{0.05}O_2$ may be prepared in a mole ratio of Ni:Co:Al=about 80:15:5.

The metal element M may be, for example, one or more kinds of elements selected from the group consisting of Al, Mn, Cr, Fe, V, Mg, Ti, Zr, Nb, Mo, W, Cu, Zn, Ga, In, Sn, La, and Ce.

In addition, the metal element M-containing compound may be, for example, various salt of the metal element M such as sulfate salt, nitrate salt, and the like, oxide and hydroxide of the metal element M, and the like.

The ion exchange water may be a product obtained by maintaining 500 ml of ion exchange water at 50° C. and by bubbling the resultant by inert gas such as nitrogen and the like to remove oxygen dissolved therein.

Then, a saturated NaOH aqueous solution is added to the above mixed aqueous solution in a dropwise fashion in order to have at pH 8 to 12, while the mixed aqueous solution is maintained at about 50° C.

The addition speed is not particularly limited, but if added too fast, a uniform precursor (co-precipitated hydroxide salt) may not be obtained.

For example, the addition speed in a dropwise fashion may be about 3 ml/min.

This treatment is performed, for example, at a predetermined agitation speed for predetermined agitation time.

In this way, hydroxide salt of each metal element is co-precipitated.

Subsequently, the co-precipitated hydroxide salt is taken from the reaction layer aqueous solution through solid-liquid separation (for example, an absorption filter) and cleaned with ion exchange water.

In addition, the co-precipitated hydroxide salt is vacuum-dried.

Herein, the vacuum drying is performed at, for example, about 100° C. for about 10 hours.

Then, the co-precipitated hydroxide salt after the drying is ground with a mortar and a pestle, obtaining dry powder.

The dry powder is mixed with lithium hydroxide (LiOH), obtaining mixed powder.

Herein, a mole ratio between Li and Ni+Mn+M (=Me) is determined depending on the composition of a lithium nickel composite oxide.

For example, $LiNi_{0.8}Co_{0.15}Al_{0.05}O_2$ may be prepared in a mole ratio of Li:Me=about 1.0:1.0.

In addition, this mixed powder is fired under an oxygen atmosphere for predetermined firing time at a predetermined firing temperature.

In this way, the lithium nickel composite oxide having a high Ni ratio is prepared.

The lithium nickel composite oxide having a high Ni ratio according to one embodiment has a diffraction peak intensity ratio ($I_{003}/I_{104}$) of (003) and (104) planes, a full width at half maximum ($FWHM_{003}$) of the (003) plane, an average secondary particle diameter (D50), and a specific surface area within predetermined ranges.

On the other hand, various parameters of the lithium nickel composite oxide having a high Ni ratio may be adjusted by the predetermined agitation speed, the predetermined agitation time, the predetermined firing time, the predetermined firing temperature and the like.

In particular, the firing temperature may be controlled to adjust other various parameters.

Specifically, as the fire temperature is higher, the diffraction peak intensity ratio ($I_{003}/I_{104}$) of (003) and (104) planes tends to increase, while the full width at half maximum ($FWHM_{003}$) of the (003) plane tends to decrease.

For example, when the firing temperature is set within about 700° C. to 800° C. after setting an agitation speed at about 4 m/s to 5 m/s of circumferential speed, the agitation time for about 10 hours, and the firing time for about 10 hours, a lithium nickel composite oxide having a high Ni ratio according to one embodiment may be obtained.

Then, a method of preparing a rechargeable lithium ion battery 10 is described.

On the other hand, the rechargeable lithium ion battery 10 may be manufactured in the same method as a method of manufacturing a conventional rechargeable lithium ion battery except for using a lithium nickel composite oxide having a high Ni ratio as a positive active material.

A method of preparing the rechargeable lithium ion battery 10 according to one embodiment is as follows.

The positive electrode 20 is prepared as follows.

First, a positive active material, a conductive agent and a binder are mixed in a desired ratio, and the mixture is dispersed into an organic solvent (for example, N-methyl-2-pyrrolidone), forming slurry.

Then, the slurry is formed on a current collector 21 (for example, coated) and dried to form a positive active material layer 22.

On the other hand, the coating may not be particularly limited but performed by using, for example, a knife coater, a gravure coater, and the like.

Each following coating process is performed in the same method.

In addition, the positive active material layer 22 is compressed to have a desired thickness by using a compressor.

In this way, the positive electrode 20 is prepared.

Herein, the positive active material layer 22 has no particularly-limited thickness but may have any thickness that a positive active material layer for a rechargeable lithium ion battery has.

The negative electrode 30 is prepared in the same method as used for the positive electrode 20.

First, a negative active material and a binder are mixed in a desired ratio, and the mixture is dispersed into an organic solvent (for example, N-methyl-2-pyrrolidone), forming slurry.

Then, the slurry is formed on a current collector 31 (for example, coated) and dried, forming a negative active material layer 32.

In addition, the negative active material layer 32 is compressed to have a desired thickness by using a compressor.

In this way, the negative electrode 30 is prepared.

Herein, the negative active material layer 32 has no particular limit to the thickness but may have any thickness as the negative active material layer in a conventional rechargeable lithium ion battery.

In addition, when lithium metal is used as the negative active material layer 32, the lithium metal foil may be overlapped with the current collector 31.

Subsequently, the separator 40 is interposed between the positive electrode 20 and the negative electrode 30, preparing an electrode assembly.

In addition, the electrode assembly is processed to have a desired shape (for example, a cylinder, a prism, a laminate type, a button type and the like) and inserted into a container having the same shape.

An electrolyte solution having desirable composition is injected into the case, and impregnates into pores of the separator 40.

Accordingly, a rechargeable lithium ion battery 10 is prepared.

Hereinafter, the embodiments are illustrated in more detail with reference to examples.

(Preparation of Lithium Nickel Composite Oxide of Examples 1 to 3 and Comparative Examples 1 to 4)

Nickel sulfate hexahydrate ($NiSO_4 \cdot 6H_2O$), cobalt sulfate pentahydrate ($CoSO_4 \cdot 5H_2O$) and aluminum nitrate (Al $(NO_3)_3$) were dissolved in ion exchange water, preparing a mixed aqueous solution.

Herein, the total weight of the nickel sulfate hexahydrate, cobalt sulfate pentahydrate and aluminum nitrate was 20 wt % based on the total weight of the mixed aqueous solution.

In addition, the nickel sulfate hexahydrate, the cobalt sulfate pentahydrate and the aluminum nitrate were mixed in a mole ratio of (80 to 84):15:(1 to 5)=Ni:Co:Al in each Example.

The ion exchange water was the product obtained by maintaining 500 ml of ion exchange water at 50° C. and by bubbling the resultant by nitrogen gas to remove oxygen dissolved therein.

Then, a saturated NaOH aqueous solution was added thereto in a dropwise fashion at a speed of 3 ml/min in order to have at pH of 11.5, while the mixed aqueous solution was maintained at 50° C.

Herein, the mixture was agitated at a circumferential speed of 4 m/s to 5 m/s for 10 hours.

Accordingly, hydroxide salt of each metal element was co-precipitated.

The co-precipitated hydroxide salt was taken from the reaction layer aqueous solution by using an absorption filter and washed with ion exchange water.

Then, the co-precipitated hydroxide salt was vacuum-dried.

The vacuum-drying was performed at 100° C. for 10 hours.

Next, the dried co-precipitated hydroxide salt was ground with a mortar and a pestle, obtaining dry powder.

The dry powder was mixed with lithium hydroxide (LiOH), obtaining mixed powder.

Herein, Li and Me (=Ni+Co+Al) were mixed in a mole ratio of 1.0:1.0.

In addition, this mixed powder was fired at 700° C. to 800° C. for 10 hours under an oxygen atmosphere.
(Preparation of Lithium Nickel Composite Oxide of Examples 4 and 5 and Comparative Examples 5 and 6)

Each lithium nickel composite oxide according to Examples 4 and 5 and Comparative Examples 5 and 6 was prepared according to the same method as Examples 1 to 3 and Comparative Examples 1 to 4 except for preparing the mixed aqueous solution by using nickel sulfate hexahydrate, cobalt sulfate pentahydrate and manganese sulfate heptahydrate ($MnSO_4 \cdot 7H_2O$).

On the other hand, nickel sulfate hexahydrate, cobalt sulfate pentahydrate and manganese sulfate heptahydrate were mixed in a mole ratio of Ni:Co:Mn=(80 to 85):(10 to 15):(4 to 10).
(Measurement of Lithium Nickel Composite Oxides of Examples 1-5 and Comparative Examples 1-6)

When a X-ray diffraction test about the lithium nickel composite oxides according to Examples 1 to 5 and Comparative Examples 1 to 6 was performed, a peak of a (003) plane was found around a diffraction angle (2θ) of 18°, and another peak of a (104) plane was found around a diffraction angle (2θ) of 44°.

Based on the peaks, a diffraction peak intensity ratio ($I_{003}/I_{104}$), of the (003) and (104) planes, and full width at half maximum ($FWHM_{003}$) of the (003) plane were calculated.

In addition, the average secondary particle diameter (D50) of lithium nickel composite oxide was measured with a laser diffraction•scattering particle distribution meter (Microtrac MT3000, NIKKISO CO., LTD, Tokyo, Japan).

Furthermore, the specific surface area of the lithium nickel composite oxide was measured in a nitrogen adsorption method.

On the other hand, the diffraction peak intensity ratio ($I_{003}/I_{104}$) of the (003) and (104) planes, the full width at half maximum ($FWHM_{003}$) of the (003) plane, the average secondary particle diameter (D50) and the specific surface area in the lithium nickel composite oxides of Example 1 to 5 and Comparative Example 1 to 6 were illustrated later in Tables 2 and 3 accompanying with charge and discharge evaluation results.
(Manufacture of Rechargeable Lithium Ion Battery Cell)

Furthermore, a rechargeable lithium ion battery cell was manufactured as follows.

First of all, each lithium nickel composite oxide in the above method, acetylene black, and polyvinylidene fluoride were mixed in a weight ratio of 95:2:3.

This mixture was dispersed into N-methyl-2-pyrrolidone, forming a slurry.

The slurry was coated on an aluminum foil as a current collector and dried to form a positive active material layer, manufacturing a positive electrode.

In addition, a negative electrode was manufactured by adhering lithium metal to a current collector.

As for a separator, a porous polyethylene film (a thickness of 12 μm) coated with $Al_2O_3$ particulate and PVdF (polyvinylidene fluoride) in a weight ratio of 70:30 on the surface was used.

This separator was interposed between positive and negative electrodes, manufacturing an electrode assembly.

In addition, the electrode assembly was processed into a 2032 coin half-cell.

On the other hand, an electrolyte solution was prepared by ethylene carbonate and dimethyl carbonate in a volume ratio of 3:7 and dissolving lithium hexafluoro phosphate ($LiPF_6$) in a concentration of 1.3 mol/L in the non-aqueous solvent.

The electrolyte solution was injected into the 2032 coin half-cell to impregnate the separator with the electrolyte solution.

In this way, the rechargeable lithium ion battery cell was manufactured.
(Charge and Discharge Evaluation)

Charge and discharge of the rechargeable lithium ion battery cells according to Examples 1-5 and Comparative Examples 1-6 were evaluated.

Specifically, a cycle test of the rechargeable lithium ion battery cells at charge and discharge rates and cut-off voltages provided in the following Table 1 was performed.

TABLE 1

| Test cycle | Charge rate | Discharge rate | Cut-off voltage [V] |
|---|---|---|---|
| 1 | 0.1 C CC-CV | 0.1 C CC-CV | 4.3-3 |
| 2 | 0.2 C CC-CV | 0.2 C CC-CV | 4.3-3 |
| 3-52 | 1 C CC-CV | 1 C CC-CV | 4.3-3 |

In Table 1, CC-CV indicates a constant current constant voltage charge, and CC indicates a constant current discharge.

The cut-off voltage indicates a voltage when charge ends and a voltage when a discharge ends.

For example, a charge at the $1^{st}$ cycle was performed until voltage of the rechargeable lithium ion battery cell reaches to 4.3 (V), and a discharge at the $1^{st}$ cycle was performed until voltage of the rechargeable lithium ion battery cell reaches to 3.0 (V).

This charge and discharge evaluation results are provided in Tables 2 and 3.

Initial charge and discharge efficiency in Tables 2 and 3 was obtained by dividing discharge capacity at the $1^{st}$ cycle by charge capacity at the $1^{st}$ cycle.

In addition, the discharge capacity was discharge capacity at the $2^{nd}$ cycle.

In addition, the capacity retention was obtained by dividing discharge capacity at the $52^{nd}$ cycle by discharge capacity at the $3^{rd}$ cycle.

First of all, Table 2 provides the result of Examples 1-3 and Comparative Examples 1-4 using a lithium nickel composite oxide having a composition of $LiNi_xCo_yAl_zO_2$ as a positive active material.

Table 2 provides x, y, and z values in each Example and Comparative Example.

TABLE 2

| | LiNi$_x$Co$_y$Al$_z$O$_2$ | | | D50 | Specific surface area | Diffraction peak intensity ratio | FWHM$_{003}$ | Discharge capacity | Initial charge and discharge efficiency | Cycle characteristics |
|---|---|---|---|---|---|---|---|---|---|---|
| | x | y | z | (μm) | (m$^2$/g) | (I003/I004) | (2θ°) | (mAh/g) | (%) | (%) |
| Example 1 | 0.80 | 0.15 | 0.05 | 7.1 | 0.95 | 1.18 | 0.1504 | 196 | 91.8 | 93.3 |
| Example 2 | 0.82 | 0.15 | 0.03 | 5.9 | 0.52 | 1.15 | 0.1419 | 202 | 93.6 | 94.2 |
| Example 3 | 0.84 | 0.15 | 0.01 | 8.5 | 0.42 | 1.1 | 0.1255 | 206 | 93.3 | 92.5 |
| Comparative Example 1 | 0.8 | 0.15 | 0.05 | 6.4 | 0.81 | 1.57 | 0.1132 | 192 | 90.0 | 88.1 |
| Comparative Example 2 | 0.81 | 0.15 | 0.04 | 13 | 1.36 | 1.22 | 0.1139 | 187 | 88.3 | 84.7 |
| Comparative Example 3 | 0.82 | 0.15 | 0.03 | 8.3 | 0.75 | 1.4 | 0.1174 | 190 | 87.5 | 86.5 |
| Comparative Example 4 | 0.81 | 0.15 | 0.04 | 15 | 0.81 | 0.71 | 0.1220 | 185 | 87.6 | 88.7 |

Referring to Table 2, Examples 1 to 3 showed a diffraction peak intensity ratio ($I_{003}/I_{104}$), a full width at half maximum (FWHM$_{003}$), an average secondary particle diameter (D50) and a specific surface area within the range of the present invention and thus, demonstrate high discharge capacity, initial charge and discharge efficiency and cycle characteristics.

On the other hand, Comparative Examples 1 and 3 showed a diffraction peak intensity ratio ($I_{003}/I_{104}$), a full width at half maximum (FWHM$_{003}$) out of the range of the present invention and thus, deteriorated cycle characteristics.

In addition, Comparative Example 2 showed a D50, a specific surface area and a full width at half maximum (FWHM$_{003}$) out of the range of the present invention and thus, deteriorated discharge capacity, initial charge and discharge efficiency, and cycle characteristics.

In addition, Comparative Example 4 showed a D50 and a diffraction peak intensity ratio ($I_{003}/I_{104}$) out of the range of the present invention and thus, deteriorated discharge capacity, initial charge and discharge efficiency, cycle characteristics.

Next, Table 3 provides the results of Examples 4 and 5 and Comparative Examples 5 and 6 using a lithium nickel composite oxide having a composition of LiNi$_x$Co$_y$Mn$_z$O$_2$ as a positive active material.

Table 3 provides x, y, and z values in each Example and Comparative Example.

On the other hand, Comparative Example 5 showed a diffraction peak intensity ratio ($I_{003}/I_{104}$) and a full width at half maximum (FWHM$_{003}$) out of the range of the present invention and thus, deteriorated initial charge and discharge efficiency and cycle characteristics.

In addition, Comparative Example 6 showed a full width at half maximum (FWHM$_{003}$) out of the range of the present invention and deteriorated initial charge and discharge efficiency and cycle characteristics.

As shown from the above results, initial charge and discharge efficiency, discharge capacity and cycle characteristics were all improved by setting diffraction peak intensity ratio ($I_{003}/I_{104}$) in a range of greater than or equal to 1.05 to 1.25 in the X-ray diffraction, simultaneously, a full width at half maximum (FWHM$_{003}$) of (003) plane in a range of greater than or equal to 0.12 to less than or equal to 0.155, an average secondary particle diameter (D50) in a range of greater than or equal to 3 μm and less than or equal to 9 μm, and a specific surface area in a range of greater than or equal to 0.38 m$^2$/g and 1.05 m$^2$/g in a positive active material including a lithium nickel composite oxide having a high Ni ratio according to an exemplary embodiment.

Herein before, the embodiments are illustrated in more detail with reference to examples. However, these examples are exemplary, and the present disclosure is not limited thereto.

TABLE 3

| | LiNi$_x$Co$_y$Mn$_z$O$_2$ | | | D50 | Specific surface area | Diffraction peak intensity ratio | FWHM$_{003}$ | Discharge capacity | Initial charge and discharge efficiency | Cycle characteristics |
|---|---|---|---|---|---|---|---|---|---|---|
| | x | y | Z | (μm) | (m$^2$/g) | (I003/I004) | (2θ°) | (mAh/g) | (%) | (%) |
| Example 4 | 0.81 | 0.15 | 0.04 | 7.02 | 0.85 | 1.1 | 0.1356 | 202 | 92.3 | 94.6 |
| Example 5 | 0.82 | 0.12 | 0.06 | 4.8 | 0.49 | 1.09 | 0.1409 | 210 | 91.8 | 91.5 |
| Comparative Example 5 | 0.80 | 0.10 | 0.10 | 9.63 | 0.92 | 1.44 | 0.1071 | 195 | 88.8 | 93.5 |
| Comparative Example 6 | 0.85 | 0.10 | 0.05 | 8.6 | 0.94 | 1.25 | 0.1053 | 202 | 87.8 | 87.2 |

Referring to Table 3, Examples 4 and 5 showed a diffraction peak intensity ratio ($I_{003}/I_{104}$), a full width at half maximum (FWHM$_{003}$), an average secondary particle diameter (D50) and a specific surface area within the range of the present invention and thus, demonstrate high discharge capacity, initial charge and discharge efficiency and cycle characteristics.

In the present disclosure, the terms "Example" and "Comparative Example" are used arbitrarily to simply identify a particular example or experimentation and should not be interpreted as admission of prior art. While this disclosure has been described in connection with what is presently considered to be practical exemplary embodiments, it is to be understood that the invention is not limited to the disclosed embodi-

What is claimed is:

1. A positive active material that includes a lithium nickel composite oxide represented by the following Chemical Formula 1, wherein a full width at half maximum ($FWHM_{003}$) at a (003) plane in X-ray diffraction ranges from about 0.12 to about 0.155, $$Li_aNi_xCo_yM_zO_2 \quad \text{[Chemical Formula 1]}$$

wherein, M is one or more kinds of metal element selected from Al, Mn, Cr, Fe, V, Mg, Ti, Zr, Nb, Mo, W, Cu, Zn, Ga, In, Sn, La, and Ce, $0.20 \leq a \leq 1.20$, $0.80 \leq x < 1.00$, $0 < y \leq 0.20$, $0 \leq z \leq 10$, and $x+y+z=1$.

2. The positive active material of claim 1, wherein the positive active material has a $(I_{003})/(I_{104})$ ratio of a diffraction peak intensity ($I_{003}$) at a (003) plane and a diffraction peak intensity ($I_{104}$) at a (104) plane in X-ray diffraction ranges from about 1.05 to about 1.25.

3. The positive active material of claim 1, wherein the lithium nickel composite oxide particle has an average secondary particle diameter (D50) of about 3 μm to about 9 μm.

4. The positive active material of claim 1, wherein the lithium nickel composite oxide particle has a specific surface area of about 0.38 m²/g to about 1.05 m²/g.

5. The positive active material of claim 1, wherein M is Al or Mn, $0.80 \leq x < 1.00$,
$0 < y \leq 0.15$,
$0 < z \leq 0.05$, and $x+y+z=1$.

6. A method of preparing a positive active material, comprising;

adding a saturated NaOH aqueous solution to a mixed aqueous solution including a hydrate of Co and Ni and an M-containing compound in a dropwise fashion so as to maintaining pH to be 8 to 12;

agitating the resulting mixture to prepare a hydroxide salt precursor of a transition metal; and mixing the hydroxide salt precursor of the transition metal with a Li compound, and firing the resultant under an oxygen atmosphere at about 700° C. to about 800 ° C. for about 1 hour to about 10 hours to prepare a lithium nickel composite oxide, wherein the M-containing compound is a sulfate, a nitrate, an oxide, or a hydroxide of the metal element M, and the M is one or more kinds of metal element selected from Al, Mn, Cr, Fe, V, Mg, Ti, Zr, Nb, Mo, W, Cu, Zn, Ga, In, Sn, La, and Ce.

7. The method of claim 6, wherein the mixing mole ratio of the hydrate of Co and Ni and the M-containing compound is Ni:Co:Al=(80 to 84) :15: (1 to 5).

8. A rechargeable lithium battery comprising;

the positive electrode including a positive active material of claim 1;

a negative electrode; and an electrolyte.

* * * * *